United States Patent Office 2,998,328
Patented Aug. 29, 1961

2,998,328
PROTECTIVE COATING AND METHOD OF PRODUCING SAME
Charles G. Munger, San Gabriel, Daniel H. Gelfer, Gardena, and Charles Abba, South Gate, Calif., assignors to Amercoat Corporation, South Gate, Calif., a corporation of California
No Drawing. Filed July 22, 1957, Ser. No. 673,544
7 Claims. (Cl. 117—70)

This invention relates to protective coatings of the silicate type, and particularly to a novel composition and method for the production of a white or colored overcoat or finish upon the outer surface of silicate type protective coatings.

Protective coatings comprising the reaction products of alkali metal silicates with finely divided metals or mixtures of such finely divided metals have been widely adopted for the protection of exposed surfaces of iron and steel, where they have proved especially valuable in imparting resistance to weathering and corrosion. One type of silicate protective coating is marketed under the brand name "Dimetcote." Coatings of this general character are also described in U.S. Patents 2,462,763, and 2,440,969. They may be formed, for example, from mixtures of a finely divided metal such as zinc, lead or aluminum and an aqueous solution of an alkali metal silicate, such as for example, sodium silicate. These mixtures are applied by conventional methods, and after application, are converted to a hard, water-insoluble condition, by a baking treatment at temperatures from about 200° F. to about 500° F. However, conversion to a hard, water-insoluble condition is preferably carried out by treatment with a suitable curing agent, as disclosed in co-pending application Serial No. 376,260, filed August 24, 1953, which has been abandoned. Such curing agents may include aqueous or nonaqueous solutions of salts capable of yielding an acid radical in the presence of the silicate coating film and which will react with the film to produce a hard insoluble coating.

Silicate coatings of the type described in the preceding paragraph have heretofore been available only in forms in which the resulting films provided largely flat tones of a somewhat monotonous character. For this reason their use has been confined generally to utilitarian purposes in which attractive appearance has not been an important consideration. Nevertheless, a demand has existed for an overcoat or finish suitable for application to a first coat of the finely divided metal pigmented alkali metal silicate type, and which would impart the desired variety of shades thereto, which would be compatible with the silicate first coatings and with the curing agents used in conjunction therewith, and which would enhance the present drab appearance of such first coats. The present invention is directed to overcoming this problem of flat and drab tones and provides an overcoating or finish coating of improved appearance in white or other colors to be applied over the outer surface of the aforesaid metal pigmented alkali metal silicate base coating.

The unique characteristics of silicate type priming coatings preclude the successful application thereto of conventional formulations of exterior paints. These characteristics result, for example, in a tendency of such paints to spread unevenly, to exhibit diminished adherence, and to flake off leaving unsightly patches. Extensive investigation has indicated that an overcoat or finish having special characteristics is required for successful application on silicate type coatings.

In accordance with the present invention, we have discovered a novel finish or overcoat for application on silicate type protective coatings which possesses outstanding properties of resistance to weathering and corrosion, is completely adherent, and shows no flaking tendency. The new finish is moreover entirely compatible with and serves to supplement the silicate type first coat, providing a wide range of attractive white and colored shades on the exterior of the first coat.

We have discovered a novel inorganic finish especially desirable for application to the outer surface of a protective coating of the silicate type which comprises an aqueous solution of an alkali metal silicate and an aqueous paste pigmented component adapted to be blended therewith, said paste including an inorganic pigment insoluble in the said alkali metal silicate, a filler, and a small proportion of a metal salt capable of reacting with said alkali metal silicate to yield a hard insoluble coating when the solution and the paste are admixed and applied to the original silicate coating surface. The coating is also adherent to and desirable for coating galvanized surfaces, zinc surfaces or zinc metallized surfaces.

In accordance with the present invention, moreover, the mixture of the aqueous solution of alkali metal silicate and the aqueous paste pigmented component may be applied to the original silicate type coating as a finish where the said original coating has been cured with a suitable curing agent, as well as to a previously uncured coating.

Furthermore, it is within the contemplation of this invention to apply a suitable curing agent or solution to the silicate finish coating in order to further harden and insolubilize the same, which curing agent may be of the same type as that used for curing the original coating. Such curing solutions are preferably solutions of a salt capable of yielding an acid radical which will react with the finish coating to harden and insolubilize the same.

Thus, the invention contemplates both cured and uncured coatings, the application thereof to metal surfaces, and metal structures having on the surface thereof a hard insoluble protective coating resulting from the application thereto and the drying thereon of superimposed layers of cured an/or uncured original and finish coatings.

The new finish or overcoat of this invention is entirely inorganic in composition. It contains no organic binders or vehicles which may be subject to weather deterioration, or to action of alkalis. It exhibits resistance to weathering, high humidity, and salt air which is unequaled by any organic type coating. In addition to providing for the first time enhanced decorative effects, it forms a very smooth surface of intense pigmentation, which has low dirt and soot pick-up and which will not chalk or alter on prolonged exposure to sunlight, heat, and atmospheric conditions.

The novel inorganic finish or overcoat of the present invention comprises two components: (1) a reactive liquid component comprising an aqueous solution of an alkali metal silicate, and (2) a pigmented blending component in the form of an aqueous paste capable of reacting with the first component to produce the desired finish coating. These two components are prepared separately and then mixed in proper proportions preferably within several hours prior to the time of application. In certain instances, however, the two components may be formulated in admixture in presence of all necessary ingredients.

In the preparation of the reactive liquid component there is dissolved in water an alkali metal silicate such as sodium silicate, potassium silicate, lithium silicate, or a mixture of such silicates. Preferably sodium silicate is used for this purpose, because of its low cost and ready commercial availability. The sodium silicate is advantageously of the low alkaline type, in which the ratio of $Na_2O$ to $SiO_2$ may range from about 1:1.6 to about 1:3.75, but it has been found that best results are obtainable with sodium silicates in which the ratio of Na₂O to SiO₂ lies between about 1:3 and 1:3.75. Low alkaline silicates of this type are preferable since they keep at a minimum any tendency toward discoloration arising from formation of sodium carbonate on the surface.

The solution of the alkali metal silicate in water, such as, for example, sodium silicate, has a concentration corresponding to a specific gravity lying in the range of about 1.3 to 1.4, i.e., containing about 30% to 40% alkali metal silicate.

The pigmented blending component is prepared in the form of an aqueous paste comprising water, one or more white or colored inorganic pigments, a reinforcing pigment or filler of inorganic character, and a metal salt of a mineral acid or a lower fatty acid. In the preparation of typical pigmented blending components the ranges of the respective ingredients employed will be of the following order of magnitude:

| Ingredient: | Parts by weight |
|---|---|
| Water | 42 to 72 |
| Pigment | 25 to 40 |
| Filler | 10 to 20 |
| Metal salt | 0.1 to 5 |

For the preparation of a pigmented blending component in the form of a white paste, any suitable white inorganic pigment which is insoluble in the alkali metal silicate component may be used, such as, for example, titanium dioxide or other titanium pigments having the requisite properties, zinc oxide, and the like. It has been found, however, that titanium dioxide is generally the most satisfactory white pigment for the purpose of this invention. Where a colored pigmented blending component is to be prepared, any suitable colored inorganic pigment which is insoluble in the alkali metal silicate component may be used. Examples of suitable colored pigments include metallic oxides, such as the red, yellow, or black iron oxides, chromium oxides, carbon black, and many others.

As reinforcing pigments or fillers there may be used any suitable member of the commonly used pigments of this type, such as, for example, mica, asbestine, asbestos, talc, clay, barytes, and similar materials. These fillers are preferably used in very finely divided form, depending upon the particular application. Thus, for example, it has been found advantageous to employ 1000 mesh mica in many instances, in formulating the aqueous paste component.

The metal salts of mineral acid or of a lower fatty acid furnish the reactive ingredient in the pigmented blending component. These salts react with the alkali metal silicate of the reactive liquid component to form insoluble silicate compounds of variable composition thereby yielding insoluble hard films of the finish or overcoat of the present invention. While any metal capable of thus entering into reaction with the silicate component may be utilized, the metal salts which have been found especially suitable are those of metals of groups IIa, IIb, III, IVb, VIIb, and VIII of the periodic system. Such metals include, for example, aluminum, barium, calcium, magnesium, manganese, lead, and zinc. There can be used the nitrates, chlorides, sulfates, carbonates, and acetates of these metals. Examples of specific metal salts which may be used in formulations include lead acetate, aluminum nitrate, aluminum chloride, barium chloride, calcium chloride, calcium nitrate, magnesium acetate, magnesium chloride, magnesium nitrate, manganese chloride, zinc acetate, and zinc chloride. Basic lead carbonate or pure lead carbonate have proved desirable in certain applications where a strong white finish is to be applied over a silicate first coat or over a galvanized undercoat. Moreover, there may also be used salts of amphoteric metals such as, for example, sodium aluminate. Mixtures of these salts may also be used.

The proportion of reactive liquid silicate component to be blended with the pigmented blending component may be varied considerably, depending upon the conditions under which the coating or finish is to be applied. In general 100 parts of the pigmented blending component will be admixed with from 50 to 90 parts by weight of the alkali metal silicate solution. The unmixed solutions of the two components have unlimited storage life. It has been found, however, that once mixed, they should preferably be used within 12 hours of mixing. The two components are generally supplied in separate packages and are mixed just prior to application to form a smooth, white suspension which becomes hard and insoluble following application. The mixture is easily applied by conventional spray gun or brush means, and no special equipment is required. For repair or retouching purposes, the finish or overcoat of this invention may be reapplied over itself or over either new or old silicate type first coats.

As previously pointed out in the more specific aspects of the present invention the finish or overcoat of this invention may be cured by application thereto of a suitable curing agent, which may be of the same type as that used for curing the first coats of the silicate type, as referred to previously. Such curing agent may be applied by brushing or spraying within two to four hours after application of the finish or overcoat, and should be allowed to cure for about 24 hours, before the finish coating is placed in service.

The finish coatings of the present invention are preferably applied to properly cured, clean, and dry first coats of the silicate type, although as previously set forth they may be applied to galvanized zinc or metallized zinc surfaces. They form hard insoluble coatings showing freedom from chalking and breakdown characteristic or organic films. When continuously exposed to water, they exhibit maximum temperature limits of resistance of 120° F., in case of continuous immersion, and up to 500° F. with no immersion. The components and the finished coatings are all noninflammable. They are resistant to chemical fumes, sea water, and to most organic solvents including alcohols, ketones, aromatics, petroleum products, and chlorinated hydrocarbons.

As mentioned previously, the finish coating of the present invention must be cured before being placed in service, by chemical treatment with a suitable curing solution. The curing agent which has been found best adapted for this purpose is a solution of a salt capable of yielding an acid radical or an insolubilizing metal ion in the presence of a silicate film which will react with the film to effect hardening and insolubilization of the same. The curing solution includes as a solvent a major portion of a water miscible organic liquid. While a limited amount of water may be present, such amount of water is advantageously limited to an amount sufficient to cause formation of an acid reaction by hydrolysis of the dissolved salt, but not sufficient to impair the surface of the finish coating to which the curing solution is applied.

The curing agent is preferably a solution of an acid reacting salt which may be either an inorganic or an organic salt of a strong mineral acid, such as, for example, the acid reacting salts of phosphoric, hydrochloric, nitric, sulfuric, or chromic acids. Among the organic salts, it has been found preferable to employ a salt of an organic amine. An organic amine salt which has been found to be especially well suited for curing purposes is dibutylamine phosphate, produced by the reaction of di-n-butylamine with phosphoric acid. The active factor in this compound is phosphoric acid, the acid radical of which will combine with the ingredients of the finish coating to render it hard and insoluble. The acid radical is released by gradual hydrolysis of the amine phosphate. Among the inorganic salts which may be employed in the curing solution, there may be mentioned such acid salts as magnesium chloride, ammonium phosphate, aluminum sulfate, which are soluble in the organic solvent selected as the vehicle and which by hydrolysis liberate an acid radical or supply an insolubilizing metal ion which will react with the film of the finish of this invention. Here also, the salts chosen must possess the characteristic of releasing their acid radicals gradually upon hydrolysis, in order to avoid adverse effects such as stratification of the finish before the curing is completed.

The vehicle in which the organic or inorganic acid salt is dissolved may comprise an organic water miscible compound in combination with a limited amount of water, such as, for example, a monohydric or polyhydric alcohol, ether, or ketone. There may be advantageously employed for this purpose, for example, aliphatic alcohols, such as methyl, ethyl, isopropyl, butyl, and higher alcohols. Isopropyl alcohol is preferred as a vehicle for performance and cost reasons, but glycols such as ethylene glycol or propylene glycol, and glycerol may be used. Water soluble ethers such as carbitol and dioxane have proved suitable. Water soluble ketones such as acetone and methyl ethyl ketone are satisfactory. In general, the amount of water present will be in the neighborhood of about 5 percent, but this may be varied somewhat in accordance with the properties of the acid salt and organic solvent employed.

After the finish coating has been applied, and prior to application of the curing solution, exposure to moisture must be avoided. The coating is allowed to dry for several hours, depending upon the circumambient temperatures. Thus, if the surface temperature is 85° F. or above, drying time may be limited to two hours; at temperatures from 75° to 85° F. four hours are required. At temperatures below 75° F., a correspondingly longer drying period is needed. The curing solution is preferably applied to the finish coat heavily by spraying, care being taken to insure wetting of the entire surface. The curing solution must be left on the finish surface for at least 24 hours. Thereafter, an excess remaining may be removed by washing with water.

Preferred curing solutions for application to the finish coatings of the present invention are those disclosed and described in copending application Serial No. 376,260, filed August 24, 1953. They include, for example, a solution of dibutylamine phosphate in 95% isopropyl alcohol, or in 95% methanol; a solution of magnesium chloride or calcium chloride of about 30% strength, in a solvent such as commercial methanol containing about 5% water can be used for curing. In certain instances a wholly aqueous solution of the calcium or magnesium salts of about the strength indicated may be used, but care must be taken to avoid formation of white stains or bloom.

The preparation of the finish compositions of the present invention may be illustrated by the following examples:

Example I

A white paste pigmented blending component is prepared by forming a suspension of 40.00 parts by weight of titanium dioxide pigment, and 19.20 parts of 1000 mesh mica in 71.64 parts of distilled water in which there has been dispersed 0.36 parts of basic lead carbonate.

Example II

A white pigmented paste component similar to that of Example I is prepared by using 0.4 part of lead acetate in place of basic lead carbonate.

Example III

A white pigmented paste component is prepared from a mixture of the following ingredients:

| | Parts by weight |
|---|---|
| Distilled water | 41.83 |
| Titanium dioxide | 40.00 |
| Mica | 19.20 |
| Zinc chloride | 0.168 |

Example IV

A while pigmented paste component is prepared from a mixture of the following ingredients:

| | Parts by weight |
|---|---|
| Distilled water | 41.664 |
| Titanium dioxide | 40.00 |
| Mica | 19.20 |
| Barium chloride | 0.336 |

Example V

A green pigmented paste component is prepared by mixing the following ingredients:

| | Parts by weight |
|---|---|
| Distilled water | 53.064 |
| Chromic oxide green | 22.00 |
| Mica | 24.60 |
| Barium chloride | 0.336 |

Example VI

A finish or overcoat mixture suitable for application to a silicate type first coat is prepared by blending until a smooth suspension is obtained:

5.7 parts by weight sodium silicate solution, sp. gr. 1.4
7.3 parts by weight of the white paste component prepared according to either Example I or II.

Example VII

The paste components as prepared in accordance with Examples I to V inclusive are admixed with 79.5 parts by weight of a low alkaline sodium silicate solution of sp. gr. 1.4 until a smooth consistency is obtained, to produce a coating ready for application.

Example VIII

A metal pigmented alkali metal silicate type first coating as described in U.S. Patent No. 2,440,969 is applied to a metal structure by conventional methods and then cured by the application thereto of a curing solution having the following composition:

| | Lbs. |
|---|---|
| Isopropyl alcohol (99%) | 428 |
| Di-n-butyl amine | 100.8 |
| Phosphoric acid (85%) | 196.0 |
| Distilled water | 22.4 |

After the first coating has been properly cured, and then thoroughly cleaned of grease and dried, there is applied a finish composition prepared in accordance with the description given in Examples I and VI. For application there is used a spray gun, employing a pot pressure of between 10 and 20 pounds, and making even, parallel passes within about one foot of the silicate coating surface. On smooth surfaces, coverage will be about 300 square feet per gallon of mixture. The finish coat is allowed to dry for several hours, depending upon the temperature.

After the finish coat has dried, there is applied thereto by spraying a curing solution having the composition used for curing the first coat, as indicated previously. The curing solution is allowed to remain on the finish coat for 24 hours and at the end of this time, excess curing solution is removed by washing down with water. The result is a very smooth, intensely white surface of attractive appearance.

We claim:

1. A method of producing a hard insoluble pigmented finish on a ferrous metal surface which comprises first applying to said surface a protective coating of the silicate finely divided metal type, allowing said coating to dry, and then applying a supplemental coating obtained by admixing from 50 to 90 parts by weight of an aqueous solution of low alkaline alkali metal silicate having a specific gravity between about 1.3 and 1.4 with 100 parts by weight of an aqueous paste pigmented component including from 42 to 72 parts by weight of water, from 25 to 40 parts by weight of an inorganic pigmented component insoluble in said sodium silicate, from 10 to 20 parts by weight of finely divided filler, and from 0.1 to 5.0 parts by weight of a water soluble metal salt capable of reacting with said sodium silicate to yield a hard insoluble coating when applied to said silicate outer surface, until a smooth suspension is obtained.

2. A method as set forth in claim 1 wherein said metal salt is lead acetate.

3. A method as set forth in claim 1 wherein said metal salt is basic lead carbonate.

4. A method as set forth in claim 1 wherein said alkali metal silicate is sodium silicate.

5. A method as set forth in claim 1 wherein said pigment is titanium dioxide.

6. A method as set forth in claim 1 including subsequently applying a curing agent comprising a solution of a salt reactive with said supplemental coating to harden and insolubilize the same.

7. A method as set forth in claim 6 wherein said reactive salt is capable of yielding an acid radical.

References Cited in the file of this patent

UNITED STATES PATENTS

| | | |
|---|---|---|
| Re. 11,082 | Bibikov | June 10, 1890 |
| 419,657 | Gesner | Jan. 21, 1890 |
| 963,810 | Sala | July 12, 1910 |
| 1,035,789 | Henning | Aug. 13, 1912 |
| 2,440,969 | Nightingall | May 4, 1948 |
| 2,449,346 | Vannoy | Sept. 14, 1948 |
| 2,462,763 | Nightingall | Feb. 22, 1949 |
| 2,600,812 | Thomas | June 17, 1952 |
| 2,765,237 | Drummond | Oct. 2, 1956 |

FOREIGN PATENTS

| | | |
|---|---|---|
| 2,608 | Great Britain | Oct. 26, 1860 |